May 28, 1963  W. J. SHANAHAN  3,091,759
SYMBOL GENERATOR
Filed Dec. 16, 1958  5 Sheets-Sheet 1

INVENTOR
W. J. SHANAHAN

BY Cushman, Darby & Cushman
ATTORNEYS

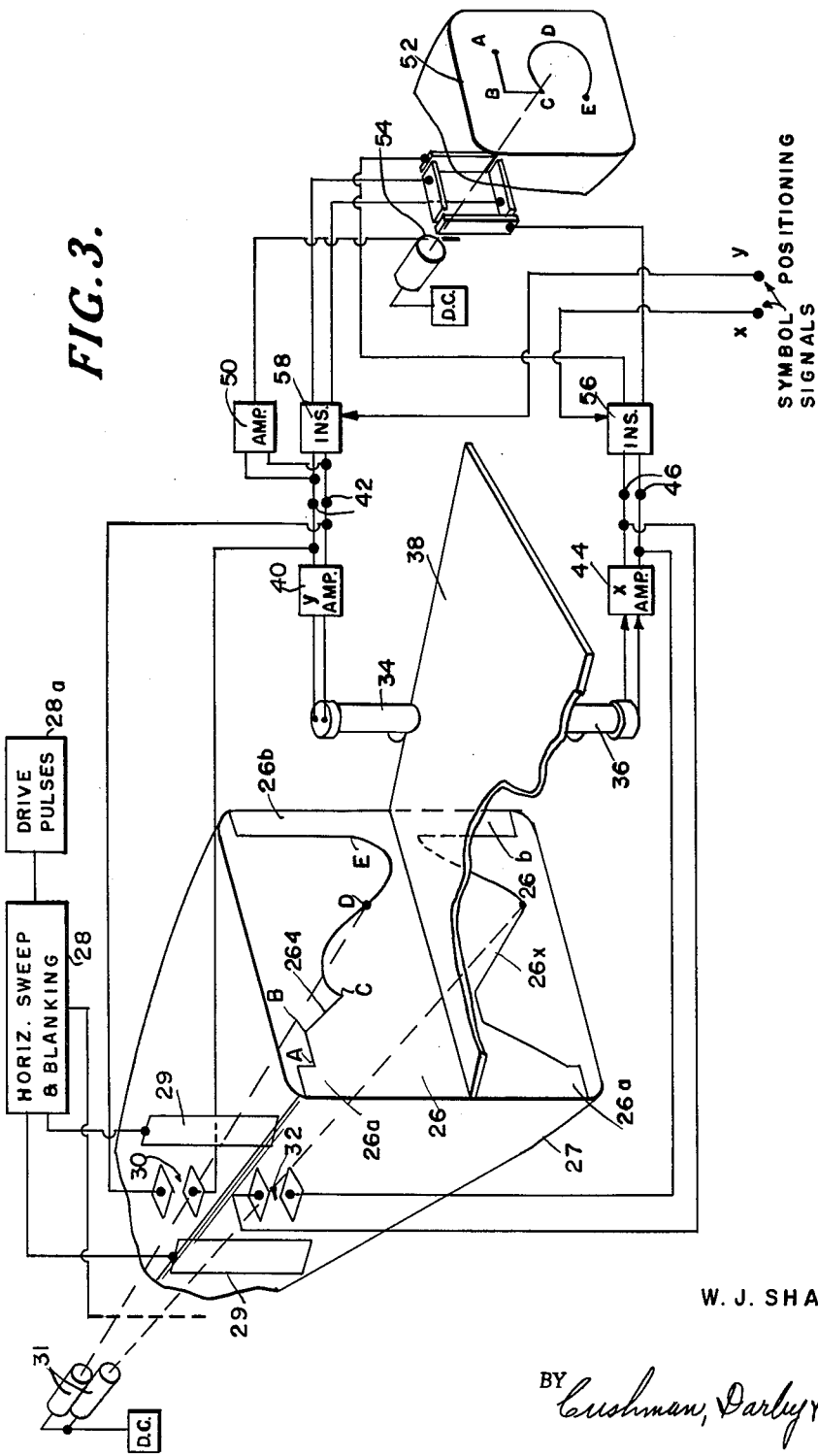

May 28, 1963 W. J. SHANAHAN 3,091,759
SYMBOL GENERATOR
Filed Dec. 16, 1958 5 Sheets-Sheet 3
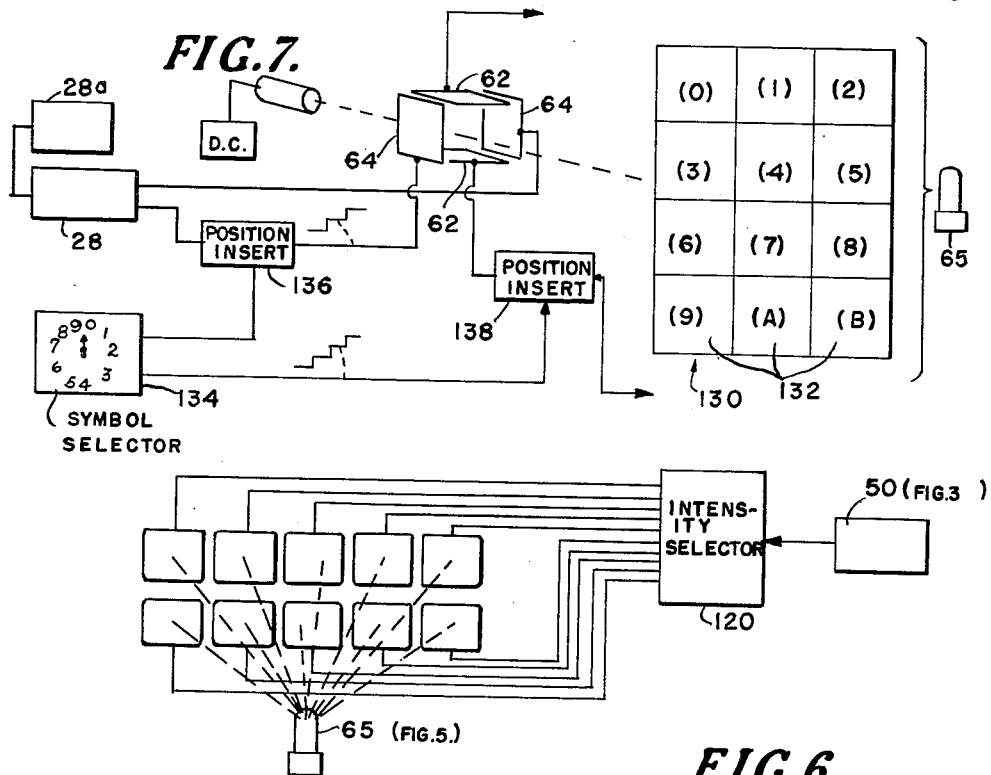
FIG. 7.
FIG. 6.
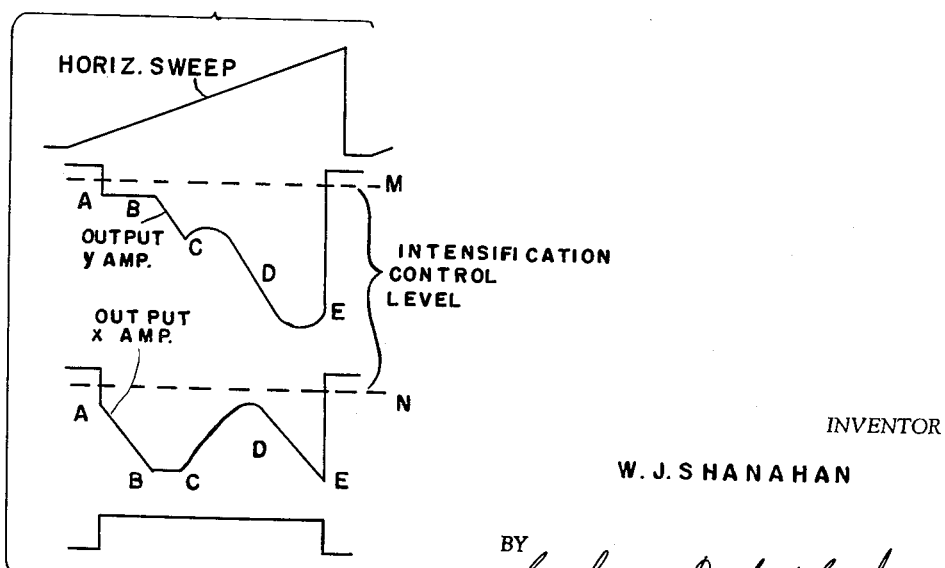
FIG. 4.
INVENTOR
W. J. SHANAHAN
BY Cushman, Darby & Cushman
ATTORNEYS

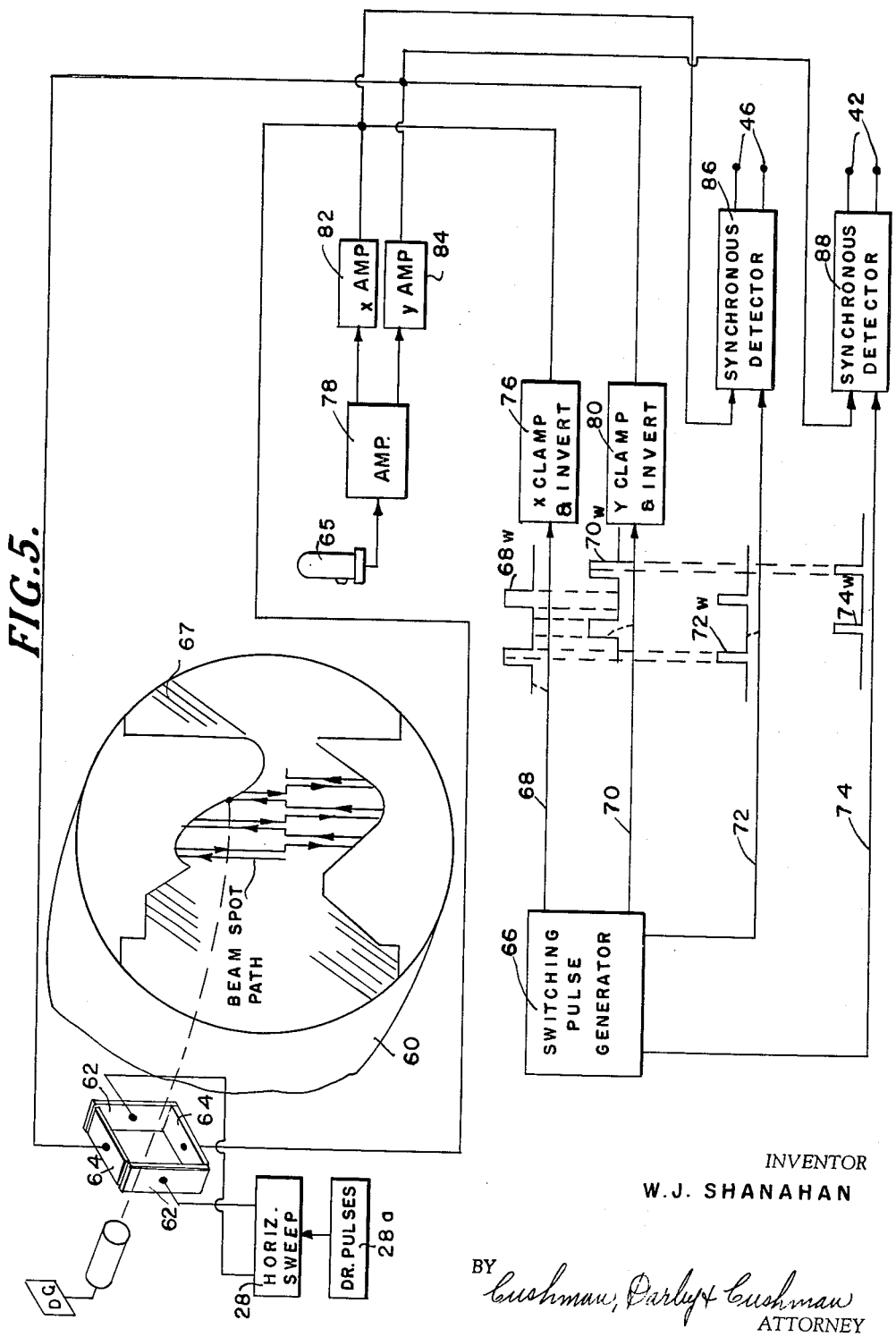

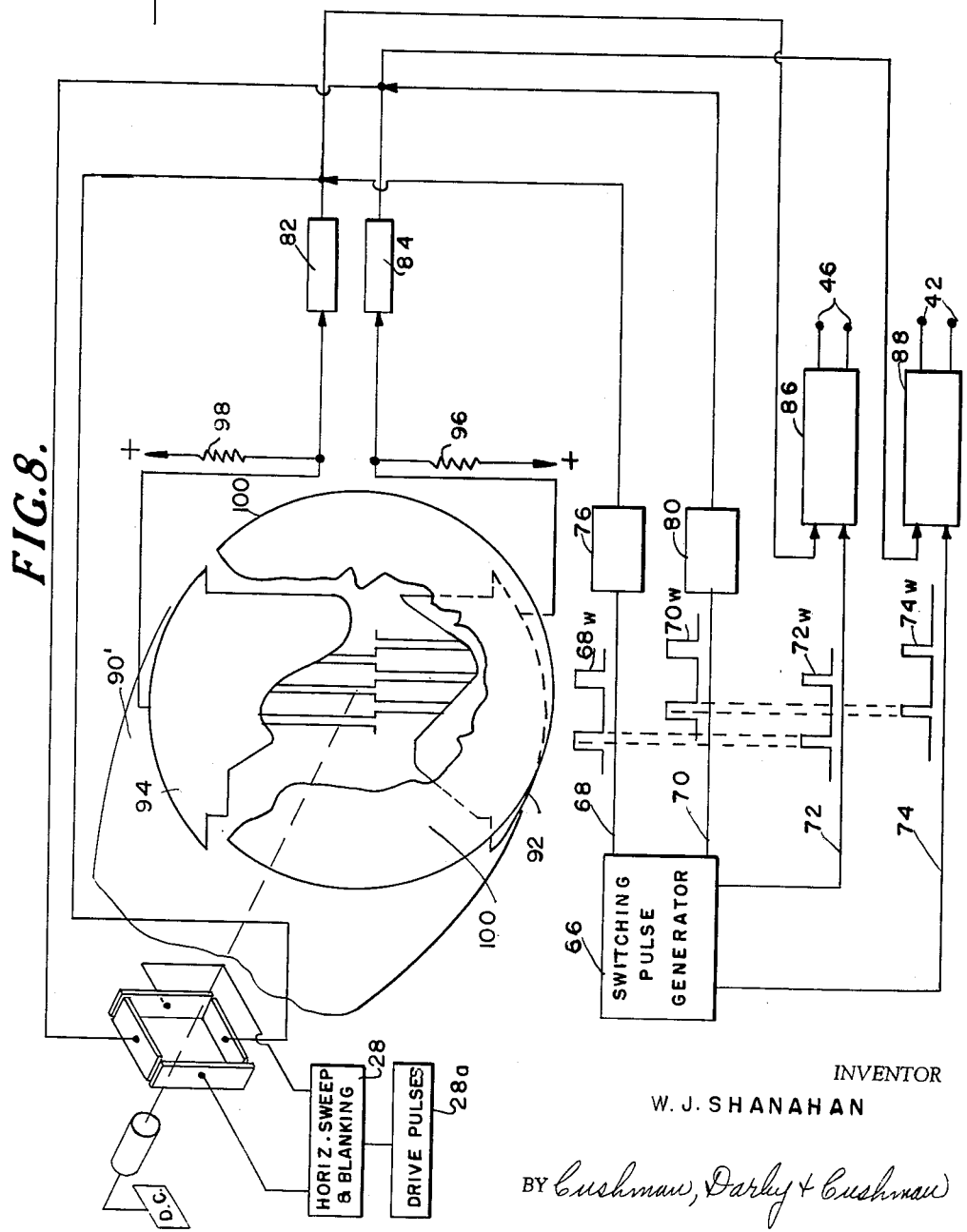

United States Patent Office 3,091,759
Patented May 28, 1963

3,091,759
SYMBOL GENERATOR
William J. Shanahan, New York, N.Y., assignor to Skiatron Electronics & Television Corporation, New York, N.Y., a corporation of New York
Filed Dec. 16, 1958, Ser. No. 780,781
6 Claims. (Cl. 340—324)

This invention pertains to apparatus for generating symbols such as numbers, letters and the like for display or other purposes.

In accordance with the present invention symbols can be generated and displayed or recorded by electronically or otherwise following the contours of complementary profiles for establishing suitable coordinate points for defining each elemental portion of the symbol. By use of the various embodiments of the invention it is possible to create or record symbols such as numbers and letters in a manner not heretofore possible.

Accordingly, the primary object of this invention is to provide improved means for generating and displaying symbols such as numbers and letters.

The many subordinate objects of the invention and the entire scope of the invention will become further understood with reference to the following detailed description of exemplary embodiments.

The exemplary embodiments can be best understood with reference to the accompanying drawings, wherein:

FIGURE 3 shows a first electronic embodiment of the invention.

FIGURE 4 shows plots of voltages versus time pertinent to FIGURE 3.

FIGURE 5 shows a second electronic embodiment of the invention which is a modification of part of the apparatus of FIGURE 1.

FIGURE 6 shows an arrangement according to the invention for selectively generating one of a plurality of symbols, and FIGURE 7 shows another embodiment according to the invention for selectively generating one of a plurality of symbols.

FIGURE 8 shows a third electronic embodiment of the invention, and

FIGURE 9 shows a detail of the apparatus of FIGURE 8.

Figure 1:
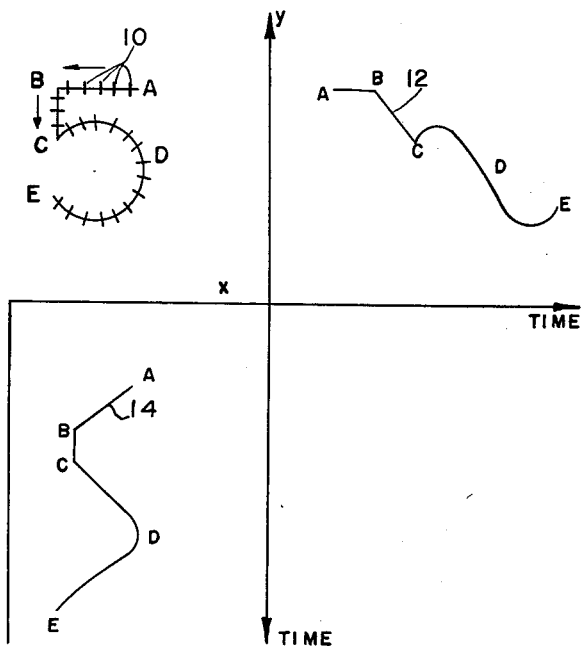
FIGURE 1 shows an exemplary symbol developed by the invention, and time versus intensity plots pertinent thereto.

The characters or symbols according to this invention are generated or "written" by moving a record making means along the contour of the symbol as shown in FIGURE 1. A number 5 as an example of a character or symbol is shown in the process of being written. The record making means, for example, an electron beam, or inking pen, starts at A, proceeds through B and C, to D and E. In order to produce this type of deflection utilizing a Cartesian device such as a cathode ray tube, it is necessary to split up the beam motion into an $x$ and a $y$ component.

A further requirement is that the writing rate of an electron beam or pen at any instant must be constant in order to permit the intensity of the number to be everywhere constant. If there were any writing rate modulation of the beam during its traverse of the number, a corresponding variation in written intensity will normally result.

The technique of sweeping a record making means such as an electron beam along the character being made has many advantages over other proposed number display devices such as monoscope TV scanning devices and magnetic core or other devices producing an array of dots. For a given writing time it will be recognized that the character in the present invention may be intensified for the entire interval, whereas if it were attempted to display the same symbol by television or other raster or quasi-raster scanning schemes, it would be necessary to keep the beam blanked or unintensified for upwards of 90% of the writing time if the characters were not to be made to appear coarse. A second advantage is that for a given resolution display tube it is possible to obtain a considerably more readable and higher resolution symbol than is possible using line scanning techniques.

The technique of symbol generation by continuous writing has been demonstrated previously by the so-called "Lissajou pattern" technique. In this technique, which has previously been employed, the symbols to be produced are composed of a series of straight lines, ellipses and sine waves suitably joined together to produce patterns which may be made to resemble commonly accepted numerical symbols. A technique has also been described for performing a similar operation using straight line segments joined together to form crude approximations to commonly utilized numbers and letters.

The present invention overcomes the limitation of the above known scheme by employing two arbitrary function generators and a means for preparing these arbitrary functions for any characters whatever.

To write the number 5 in accordance with the present invention, it is necessary to produce the corresponding $x$ and $y$ deflection waveforms. For this reason two functions must be generated such that any combination of values taken at a given instant must define a point on the curve. In addition the functions must be such that $$\left(\frac{dx}{dt}\right)^2 + \left(\frac{dy}{dt}\right)^2$$

is a constant, representing the velocity of the spot along the curve to be scanned.

In order to understand how these criteria may be met simultaneously, reference is made to FIGURE 1. Assume that the number 5 is to be traced or generated in the direction shown. A series of equal spaces 10 representing equal time intervals are marked off along the curve representing 5. These time intervals correspond to fractional parts of the character writing period. There are then laid off as a function of time, the vertical or $y$ component 12 and horizontal or $x$ component 14 of the number as taken from the curve. This is shown in FIGURE 1 and the corresponding points of the $x$ and $y$ waveforms are labeled so as to indicate the correspondence with the points on the numerical symbol. By assuming equal time intervals the $x$ and $y$ waveforms are automatically drawn so that the sum of the squares of the $x$ and $y$ rates automatically will be as a constant.

Figure 2:
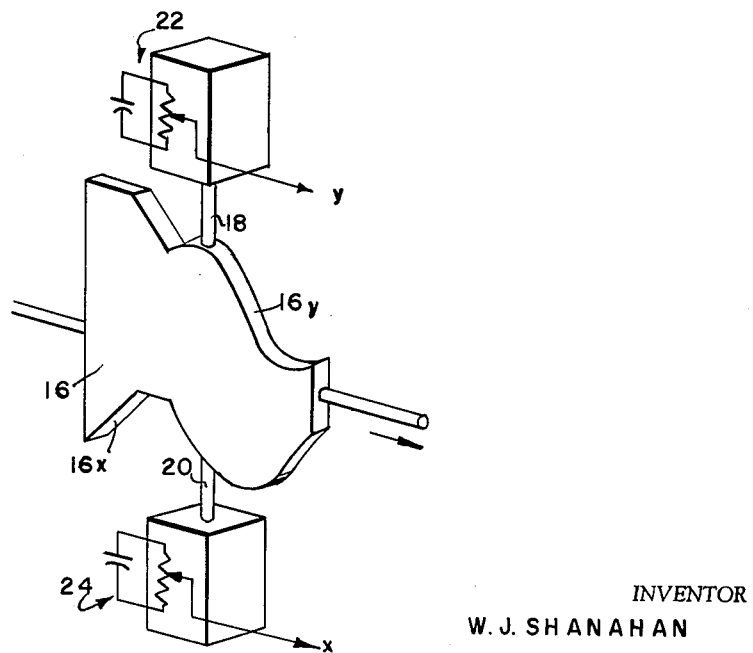
FIGURE 2 shows a mechanical arrangement for producing complementary deflection potentials according to an embodiment of the invention.

It is necessary to produce two such waveforms 12 and 14 as are shown in FIGURE 1 as a function of time. These waveforms must be generated simultaneously and in correct phase. Several techniques have been discovered. If the number is to be written slowly, as for a mechanical plotter, the $x$ and $y$ waveforms may be cut into the shape of cams. This is shown schematically in FIGURE 2. A cam 16 is cut to the form of the $y$ waveform on one surface 16$y$, and to the form of the $x$ waveform on its opposite surface 16$x$. The cam is shown schematically as having a horizontal linear motion, provided by any suitable means (not shown). Cam followers or plungers 18 and 20 ride along the upper and lower edges, respectively, of cam 16 to move potentiometers 22 and 24 connected to appropriate sources of voltage and producing therefore corresponding outputs as functions of time. If the outputs of these potentiometers were set to the horizontal and vertical inputs of a graphic servo-driven plotting pen recording board, for example, the number would be accurately reproduced by the pen.

For many applications in which such symbol is to be produced the waveforms must be produced at a much higher rate. For this reason an electronic curve follower is required. Such an electronic curve follower may be constructed to produce an electrical output corresponding to a mask cut in the desired shape. Reference is now made to FIGURE 3. In this diagram a mask 26, the upper edge 26y of which corresponds to the y waveform, and the lower edge 26x of which corresponds to the x waveform, is shown in place on the face of a dual beam cathode ray tube 27. The dual beam tube has a single horizontal deflection or sweep circuit 28 driven by pulse circuit 28a and working into the deflecting plates 29, but employs two separate vertical deflection circuits working into an upper set 30 and lower set 32 of deflecting plates. Two guns 31 are provided, and a grid 33 for conventional blanking of the spot during horizontal retrace.

Two photocells are positioned in front of the mask: one is 34 suitably masked off from the other, designated 36 by barrier 38 so that each is able to see only its corresponding beam spot.

The rest position of the upper beam is at the upper edge of the tube, and the rest position of the lower beam is at the lower edge of the tube. This may be accomplished by applying a suitable D.C. potential across the deflection plates 30 and 32 of the double beam cathode ray tube.

An amplifier 40 connected to the photocell 34 is provided which, however, tends to drive the upper beam toward the center of the cathode ray tube if any light from the beam spot arrives at the cell 34 so as to provide an output therefrom. This amplifier is of sufficient gain to be capable of full-scale deflection of the beam spot with an input corresponding to a small fraction of the total possible light output from the beam spot.

For this reason the beam does not remain at its rest position, but is driven downward by the output of the amplifier until it lies partially behind the upper edge of the mask. As the beam begins to disappear behind the mask the photocell sees less and less of the beam until finally an equilibrium position is arrived at such that the amount of light reaching the photocell is just barely able to sustain the downward deflection. The spot will then hug the upper edge of the mask. A y output signal is also available from amplifier 40, as at terminals 42. A corresponding wave, the output from photocell 36, is fed to amplifier 44 which is connected to plates 32 to drive the lower beam upward toward the center of the tube. The lower beam is therefore made to follow the lower edge of the mask. The x output is available at terminals 46.

In order to produce the y waveform from this device, a sweep or sawtooth waveform is applied to the horizontal deflection plates 29 of the cathode ray tube. This causes the horizontal position of both spots to move continuously from left to right. The spots continuously hug the edges of the mask and therefore the corresponding outputs from the outputs of the amplifiers must therefore represent the x and y voltage waveforms corresponding to the horizontal and vertical components of the symbol.

It will be noted that suitable design of the amplifier is desirable to prevent the spot from hunting. Hunting will normally occur if extensive phase shifts are produced in the amplifier or in the phosphor of the cathode ray tube itself. Those of ordinary skill in the art will understand the solution to this problem.

Continuing with FIGURE 3, it will be noted that while the typical x and y waveforms corresponding to the number 5 have been shown on the mask, the left and right sides of this mask have been prolonged vertically as at 26a and 26b to produce elevated pedestals to the left and to the right of the waveform generating portions of the mask. The resulting waveforms for the y and x portions of the signal are as shown in FIGURE 4, parts a and b, respectively, in each case prior to sweeping across the portion of the mask betwen points A and E. The beam spot lies behind the elevated pedestals, producing a corresponding pedestal in the resultant waveform. One or both of these waveforms may then be amplified by conventional circuits such as 50 above levels M or N, as is shown in FIGURE 4, and the output employed as the intensification waveform shown. Reshaping of this waveform may be desirable in an attempt to still further limit the width of the number.

In producing a number using this technique, it is necessary to have a sweep waveform on the face of the cathode ray tube 27 which is sufficiently large to deflect horizontally well into both pedestal areas on the left and right side of the cathode ray tube. It is also desirable to blank the retrace of the cathode ray tube 27 in order to prevent the same number from being generated in reverse during the reverse traverse of the spot. Both of these specifications may be met by simple standard circuitry. Circuit 50 may automatically decrease the intensity of the beam of display device 52, by acting upon a control electrode 54. The positioning of the sweep and its size are not critical so long as the sweep is at least large enough to scan across the face of the tube 27. If the sweep is displaced slightly in a horizontal direction, the only result is to cause the number to be generated a little earlier or later in time, but no change or distortion in the number will result. In addition, since the blanking waveform is generated from the x and y waveforms directly, it is automatically timed to coincide with the beginning and end of the number regardless of the positioning of the sweep waveform.

The display cathode ray tube 52 may be a Skiatron dark trace tube or any other type of electrostatically or magnetically deflected tube. The techniques described herein are also suitable for the generation of symbolic characters to be displayed upon any type of x, y recorder if the generation of the symbols is accomplished at an acceptable speed.

In practice, tube 52 may be large and a symbol intended to be only a part of a total display, and the system intended to be capable of selective placement of the symbol in various areas of the tube face. For this purpose D.C. insertion circuits 56 and 58 may be employed to orient the symbol "rest" or reference position of the spot according to x and y coordinate points respectively.

It will be recognized that in lieu of a single dual beam cathode ray tube that two separate cathode ray tubes might also be employed, one carrying each mask. If this is the case, however, the deflection sensitivity must be equal or provision must be made for adjusting the horizontal sweep waveform so that corresponding x and y points are traced out at the same instant.

A further embodiment of the invention utilizes a single beam cathode ray tube to scan both masks. In this technique a single beam is switched back and forth between the upper and lower edges of the mask, thus producing two output waveforms which may be separately rectified and used for the generation of number waveforms. A block diagram of the dual reflection technique is shown in FIGURE 5. In this diagram a single beam cathode ray tube 60 is shown. There are two sets of deflection plates, one set 62 for horizontal and one set 64 for vertical. The mask 67 is substantially the same as that shown in FIGURE 3, with the y waveform cut into the top of the mask and the x waveform into the bottom. A single photocell 65 watches the face of tube 60.

In order to produce the correct deflection waveform, electronic switching pulses must be provided. These are generated in circuit 66. The output of the high PRF pulse generator consists of the following signals:

An $x$ sample on line 68
A $y$ sample on line 70
An $x$ detect on line 72
A $y$ detect on line 74

The $x$ sample and $y$ sample waveforms are pulses chosen to interleave in time so that at no time do they occur together. These may be produced by conventional multivibrators and delay circuits or may be taken from successive outputs of a ring counter. While in theory the $x$ and $y$ sampling waveforms might consist merely of the outputs from the opposite plates of a single multivibrator, it is desirable because of the finite decay time of the phosphor to provide some separation between the $x$ and $y$ sample waveforms, as is shown by the vertical alignment of the waveforms 68$w$, 70$w$, 72$w$ and 74$w$. The $x$ and $y$ detect waveforms are narrower pulses than the $x$ and $y$ sample waveforms and are chosen to fall near the end of their respective periods.

The $x$ sample waveform is applied to a clamping circuit 76, which includes an inverter. This produces a waveform which is "clamped" to an arbitrary D.C. level which may be ground. During the unclamping time the voltage at the output of the clamp tube will normally rise to B+ except in the presence of a suitable signal from the amplification circuit 78 of photocell 65 which is connected as through a diode or parallel connected triode to prevent the waveform from completely rising to B+. If no output from the photocell occurs, therefore, the output from the $x$ clamp will swing between the clamp level and B+ during the $x$ sampling period. The output form the $x$ clamp is connected to one of the vertical deflection plates. The other vertical plate is connected to circuit 80 in $y$ sample line 70 and therefore said other plate is clamped to the reference level during the entire time of occurrence of the $x$ sampling pulse. Therefore, the $x$ sampling pulse is solely effective in producing the beam vertical deflection during the $x$ sampling period. As the deflection voltage rises, however, the beam reaches a point where the phosphor light spot may be "seen" by the photoelectric cell, producing an output. This output is amplified by circuit 78 and applied to an $x$ amplifier 82 connected in parallel with the output of the $x$ clamp. This is to limit the deflection waveform applied to the deflection plates to prevent the beam from rising appreciably above the top of the mask. In this respect the entire system constitutes a negative feedback loop and is similar to the system described in FIGURE 3. Due to the phosphor response time as well as other time delays in the circuits, there may be some overshoot of the beam past the edge of the mask which is damped to zero during the sampling interval. For this reason the sampling interval should be chosen to be sufficiently long compared to the phosphor decay time. Compensating networks of either the lead or lag type may be employed as in conventional feedback amplifiers to stabilize the system to prevent excessive hunting.

At the end of the $x$ sample period, the lower deflection plate is again clamped to the reference level and the $y$ clamp 80 then operates, attempting to pull the upper deflection plate to B+. This would normally cause the beam to be deflected to or beyond the upper limit of the tube face, or by feedback from the photocell to the $y$ amplifier 84, prevent it from going beyond the edge of the mask. The amplifier is designed to load down the $y$ clamp with a sufficiently large signal of negative polarity to prevent the beam from moving above the edge of the mask.

The beam is, therefore, caused to travel in the path shown in the diagram in FIGURE 5, following alternately the upper and lower edges of the mask. It should be recognized, of course, that the time scale is grossly exaggerated in the figure to show details. Normally the sampling frequency is at least 60 to 100 times the horizontal scanning rate, so that a large number of samples are taken during a single scan. The outputs of the $x$ and $y$ clamp circuits, therefore, represent square wave carriers, amplitude modulated on one side by the $x$ and $y$ masks, respectively.

In order to recover the mask waveforms it is necessary to detect these signals. This may be accomplished by conventional diode detectors, but is preferably done in a synchronous detector to permit the output to follow rapid changes in the waveforms on the mask. The use of a single diode detector would be limited by all of the factors which conventionally prevent such detectors from following variations in the modulation which are at a high rate compared to the carrier frequency.

While the $x$ and $y$ deflection waveforms may be combined in a push-pull deflection circuit so as to maintain more uniform focus across the face of the electrostatically deflected tube, the $x$ and $y$ waveforms would not be as easily separable as in the illustration given here. The waveforms in this case are available on separate wires and may therefore be easily rectified without cross-talk.

Synchronous detectors 86 ($x$ channel) and 88 ($y$ channel) of conventional design are shown in FIGURE 5. These constitute a bi-directional switch which is open for a time interval equal to the $x$ and $y$ detection pulse periods. An output condenser in each (not shown) holds the sampled waveform until the next pulse arrives. The $y$ output is on terminals 42, and $x$ on terminals 46. The remainder of the system of FIGURE 3 applies.

The final waveforms have a slight staircase waveform on the rising and falling fronts, but these may be easily removed by the addition of low pass filters without causing unnecessary integration of the waveform. The detection pulse is timed to occur near the end of the sampling period in order that any transients which may be introduced by overshoot in the feedback amplifier, etc., may have subsided before sampling takes place. The output waveforms are then substantially the same as those obtained in the scheme of FIGURE 3. These waveforms will contain blanking pedestals which may be treated as explained in connection with FIGURE 3, to produce a blanking waveform which is suitable for intensifying the cathode ray tube 52 on which the numbers are to be displayed.

A number of minor detailed features may be employed to make the intensification waveform less critical. The simplest of these consists of slightly integrating and thus delaying the leading edge of the blanking and slightly integrating or otherwise delaying the sudden return of the $x$ and $y$ waveforms to the rest position at the end of the number. This prevents "tails" from appearing at the leading and trailing edges of the number by assuring that despite any delays in the system the beam is intensified only during the actual time the number is to be written, and when the number writing beam is in the correct position.

In the use of the invention described in the foregoing, it is necessary to select the symbol to be displayed. The selection among a number of symbols may be done mechanically or electrically. A simple means for mechanically changing the mask for symbols would consist of moving a strip containing a series of masks physically in front of the cathode ray tube 27 or 60 so as to bring up a different mask for each number to be generated. Alternatively, the light from the cathode ray tube may be imaged upon a mask using a lens system, in which case the masks may be made considerably smaller than the actual size of the cathode ray tube. This might lend itself conveniently to the placement of masks on the periphery of a rotating wheel which may be stepped to one out of ten or more positions by a mechanical stepping switch or equivalent.

This technique is, of course, suitable only when symbols or combinations of such must be changed only at a slow rate. If numbers are to be selected at a high rate, an electronic switching technique must be employed. In this case, a bank of 10 cathode ray tubes, each with its appropriate mask, may be clustered in front of a single photocell, as shown in FIGURE 6. A simple one-inch photocell may be employed for this purpose and has been found to be quite satisfactory. The number to be written is selected simply by intensifying only one of the 10 cathode ray tubes for the duration of the corresponding sweep, using any suitable switching circuit block 120 in FIGURE 6. For certain applications it is desirable to write the number more than once, in which case the intensification is left on for a longer period of time. In this case only a single photocell clamp detector is required for each channel. Separate circuits are not required for each number, since only one number is generated at a time. The output of the $x$ and $y$ clamping amplifiers are connected to the vertical deflection plates of all tubes in parallel, but feedback is obtained only from the tube which is being intensified. It is, of course, necessary in this design to take precautions that no more than one of the cathode ray tubes may be intensified at a single time.

Another means which may be employed, outlined in FIGURE 7, is to deflect the "raster" to various parts of a large cathode ray tube which is provided with numerous number generating masks, as shown. If the "raster" is made of such size that it may be positioned behind the various masks with sufficient overlap, the deflection may be accomplished relatively simply. A single composite mask bearing twelve cutouts 132 may be placed in front of tube 130 with a single photocell employed as a pickup. To select any of the symbols as from zero to nine an $x$ deflection voltage which may take one of three possible levels may be added to the horizontal sweep voltage as a "base." Similarly, a $y$ voltage of four levels may be added as a base to the vertical sweep voltage. Any selector circuit 134 may apply the insertion voltages to position insert circuits 136 and 138.

The above described embodiment of FIGURES 3 and 5 use a photoelectric means for producing waveforms by causing a cathode ray tube to follow along the edges of the mask. In accordance with a further embodiment now to be described it is possible to utilize a tube without a photocell for this purpose. This is outlined in FIGURE 8, which is the same as FIGURE 5 except for equipment between tube 90 and amplifiers 82 and 84. In this diagram a modified cathode ray tube 90 is shown. The cathode ray tube does not necessarily have a phosphor face, although one may be used to indicate the correct operation of the circuit. Instead, two metal electrodes 92 and 94 are cut in the shapes shown with contours corresponding to the $x$ and $y$ deflection waveforms associated with the symbol to be generated. The electrode 92 operates by drawing the current of the electron beam through a suitable load resistor 96 from a source of + potential. Electrode 94 draws current through load resistor 98. In each case an output voltage is produced, depending upon the percentage of the electron beam which is intercepted by the electrode. In general, still a third high voltage electrode must be provided to attract all electrons not trapped by the upper or the lower mask. The third electrode 100 may be placed in front of electrodes 92 and 94, as shown in FIGURE 9. Thus there is no voltage produced across either of the mask electrodes 92 or 94 when the beam impinged only upon electrode 100. When the beam swings up and intersects the upper mask electrode 94, a negative going voltage is produced across the corresponding load resistance 98. When it swings down to intersect the lower mask electrode 92, the same result is achieved across resistance 96. Thus the output from the metal electrodes may be considered to be analogous to the output from the photocell in FIGURE 5, and may be processed in the same way. The remainder of the circuit is substantially the same as FIGURE 5, since the output signals are then fed back through the appropriate circuits. Intensification and other waveforms may be generated in substantially the same manner as was described above, for FIGURES 3 and 5.

In the embodiment of FIGURE 8 there are several other equivalent configuration electrodes which are intended to be covered by this application. One variation is the use of a solid mask with the number waveforms cut in its upper and lower surfaces rather than two separate masks whose inner edges correspond to the waveforms to be produced. Since the two masks may be connected electrically together, and since the $x$ and $y$ deflection waveforms are produced at different times, this is quite permissible. In addition, it is also possible to use the back electrode 100 which is normally used to attract the stray electrons to produce the output waveform for application to the $x$ and $y$ amplifiers. In this case the metal masks may be connected to ground or to a suitable high voltage return without the use of a load resistance in their returns. Alternatively, the mask may be built much in the form of a conventional monoscope in which the design is etched or printed upon the surface, with certain areas of the surface affording a low resistance and other areas affording a high resistance to the transfer of electrons.

It is to be understood that use of beam intercepting electrodes can be employed instead of the photocell arrangement in the systems of FIGURES 3 and 5 as well as FIGURE 8.

From the foregoing it will be apparent that in general the apparatus provides means for producing a first train of signals, the $x$ signals, which vary in value with time as the horizontal sawtooth sweep progresses for establishing one coordinate value. Concurrently, there is means for producing a second train of signals, the $y$ signals, varying in value with time as the horizontal sawtooth sweep progresses, for establishing the second coordinate reference. Finally, there is means at the display device responsive jointly to the first and second trains of signals for tracing out the symbol.

The foregoing detailed description of illustrative embodiments is only given to provide a clear understanding of the invention and the true scope of the invention is to be determined from the appended claims.

What is claimed is:

1. In apparatus for generating concurrent $x$ and $y$ coordinate signals for tracing a symbol on a display, stationary mask means having two separated profile edges each of different varying contour with each having a base axis, said base axes being parallel, means for generating energy and for impinging same upon said mask means, means for imparting motion to said energy in a direction substantially parallel to said axes, means for imparting motion to said energy in a direction transverse to the first mentioned direction of motion to cause said energy to intercept both said profile edges continually during movement of said energy in the said first direction, means for focusing said energy in the region of said profile edges to a given dimension, the range of excursions of each profile edge away from said axis thereof being greater than said dimension of said energy source, and means responsive to interceptions of said energy with the said profile edges for simultaneously generating the said coordinate signals for said display.

2. Apparatus as in claim 1 wherein said mask means itself includes means for effecting pedestals in said coordinate signals.

3. Apparatus as in claim 1 wherein at least one end of each of said profile edges is farther from its respective said base axis in said transverse direction than the distance which said energy can be moved from that respective axis in that direction by said transverse direction motion imparting means.

4. Apparatus as in claim 1 wherein said mask means is a single, energy absorbing mask having two opposite edges as the said two profile edges.

5. Apparatus as in claim 4 wherein corresponding ends of said two profile edges are separated a distance effectively greater than the possible distance of movement of said energy in said transverse direction for effecting beginning and ending pedestals in each of said coordinate signals for each movement of said energy across said mask in said first direction.

6. Apparatus as in claim 1 wherein a single cathode ray beam constitutes the source of said energy, the apparatus including time sharing means for deflecting said beam alternately to continually effect interception of one profile edge and then of the other during the progression of movement of the beam in the said first direction, and means for detecting the engagement of said beam with each profile edge for generating said $x$ and $y$ coordinate signals, wherein the said mask means is electrically conductive and includes two separated masks respectively having said profile edges facing each other, and wherein the apparatus includes a third conductive member positioned to intercept said beam when it is not engaging either of the said masks.

References Cited in the file of this patent

UNITED STATES PATENTS

| | | |
|---|---|---|
| 2,298,536 | Logan | Oct. 13, 1942 |
| 2,455,532 | Sunstein | Dec. 7, 1948 |
| 2,528,020 | Sunstein | Oct. 31, 1950 |
| 2,844,759 | Bryan | July 22, 1958 |
| 2,872,669 | Johnson | Feb. 3, 1959 |
| 2,907,018 | Haining | Sept. 29, 1959 |